United States Patent
Deng et al.

(10) Patent No.: US 10,139,084 B2
(45) Date of Patent: Nov. 27, 2018

(54) ASSEMBLY FIXTURE AND ASSEMBLY METHOD FOR BACKLIGHT MODULE

(71) Applicants: BOE Technology Group Co., Ltd., Beijing (CN); BOE Optical Science and Technology Co., Ltd., Suzhou (CN)

(72) Inventors: Xing Deng, Beijing (CN); Baobin Yang, Beijing (CN); Xiaozeng Pei, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 233 days.

(21) Appl. No.: 15/098,474

(22) Filed: Apr. 14, 2016

(65) Prior Publication Data

US 2017/0089550 A1   Mar. 30, 2017

(30) Foreign Application Priority Data

Sep. 28, 2015   (CN) .......................... 2015 1 0627333

(51) Int. Cl.
  *F21V 17/06*   (2006.01)
  *F21V 17/00*   (2006.01)
  (Continued)

(52) U.S. Cl.
  CPC ............ *F21V 17/06* (2013.01); *F21V 17/005* (2013.01); *G02B 6/00* (2013.01); *G02B 6/0065* (2013.01);
  (Continued)

(58) Field of Classification Search
  CPC ......... G02F 1/133322; G02F 1/133325; G02F 1/133528; G02F 1/133514;
  (Continued)

(56) References Cited

U.S. PATENT DOCUMENTS

2009/0015749 A1* 1/2009 Tang ................. G02F 1/133308
                                                            349/58
2016/0018587 A1* 1/2016 Koraishy ............. G02B 6/0065
                                                            156/708

FOREIGN PATENT DOCUMENTS

CN        101710217 A      5/2010
CN        203579174 U      5/2014
                      (Continued)

OTHER PUBLICATIONS

First Office Action from Chinese Patent Application No. 201510627333. 1, dated Jul. 5, 2017, 8 pages.

*Primary Examiner* — Jun Yoo
(74) *Attorney, Agent, or Firm* — Westman, Champlin & Koehler, P.A.

(57) ABSTRACT

The embodiments of the present disclosure provide an assembly fixture and assembly method for a backlight module, so as to improve assembly efficiency and assembly yield of the backlight module. The assembly fixture includes: a vision alignment system for acquiring a first coordinate information of the set of optical elements and a second coordinate information of the back plate, calculating a fitting location coordinate information depending on the first coordinate information and the second coordinate information, and sending the fitting location coordinate information to a manipulator; and a manipulator for aligning the set of optical elements with the back plate depending on the fitting location coordinate information, and embedding a protrusion structure of the set of optical elements into a groove structure of the back plate by a preset tilt angle, and then laying the set of optical elements on the back plate.

7 Claims, 4 Drawing Sheets

(51) Int. Cl.
*G02F 1/13357* (2006.01)
*G02B 6/00* (2006.01)
*F21V 8/00* (2006.01)

(52) U.S. Cl.
CPC ......... *G02B 6/0088* (2013.01); *G02F 1/1336* (2013.01)

(58) Field of Classification Search
CPC ......... G02F 1/133516; G02F 1/133602; G02F 1/133603; G02F 1/1333–1/1347; G02B 6/0086–6/0091; G02B 6/005–6/0055; G02B 6/0065; G02B 6/0043; G02B 6/0068; H01L 33/62; H01L 33/486; H01L 2924/00; H05K 13/022; B23P 19/04
See application file for complete search history.

(56) References Cited

FOREIGN PATENT DOCUMENTS

| | | |
|---|---|---|
| CN | 103963422 A | 8/2014 |
| CN | 104816280 A | 8/2015 |
| CN | 204524708 U | 8/2015 |
| JP | H0523559 A | 9/1993 |

\* cited by examiner transferring the set of optical elements from the first assembling disk to right above of the vision alignment system by the manipulator

acquiring the first coordinate information of the set of optical elements located right above the vision alignment system and the second coordinate information of the back plate located on the second assembling disk, and calculating the fitting location coordinate information regarding the set of optical elements and the back plate depending on the first coordinate information and the second coordinate information, and sending the fitting location coordinate information to the manipulator, by the vision alignment system

aligning the set of optical elements with the back plate depending on the fitting location coordinate information, and embedding the protrusion structure of the set of optical elements into the groove structure of the back plate by the preset tilt angle, and then laying the set of optical elements on the back plate, by the manipulator, so that the set of optical elements and the back plate fit against each other

Fig. 3

ASSEMBLY FIXTURE AND ASSEMBLY METHOD FOR BACKLIGHT MODULE

CROSS-REFERENCE TO RELATED APPLICATION

This application claims the benefit of Chinese Patent Application No. 201510627333.1 filed on Sep. 28, 2015 in the State Intellectual Property Office of China, the whole disclosure of which is incorporated herein by reference.

BACKGROUND OF THE INVENTION

Field of the Invention

Embodiments of the present disclosure relate to a technical field of assembly fixture, in particular, to an assembly fixture and assembly method for a backlight module.

Description of the Related Art

In a flat panel display device, a thin film transistor liquid crystal display (TFT-LCD) has the following advantages: small volume, low power consumption, relatively low-cost production, no radiation, and the like. As a result, the TFT-LCD occupies a leading position in current flat panel display market.

The liquid crystal panel is a passive display device, which itself is not light-emitting, a backlight module is thus needed to provide a light source for the liquid crystal panel. At present, a side-type backlight source comes to be in widespread use in the backlight module based on liquid crystal display technology. As shown in FIG. 1, a backlight module in the prior art comprises: a light guiding plate 11, a light strip 12 and a back plate 13; wherein the light strip 12 is located on a light-incident side of the light guiding plate 11. During an assembly process, the light guiding plate 11 and the light strip 12 are typically affixed together to form a set of optical elements 14. A groove structure 15 is provided in a side face of the back plate 13 at one end thereof, and a protrusion structure 16 intended to be matched with the groove structure 15 is provided on one end of the set of optical elements. The set of optical elements and the back plate 13 are then secured together by means of the groove structure 15 and the protrusion structure 16.

However, the assembly process is generally implemented by manually controlling relative position between the light guiding plate and the back plate to locate and assembly them, as the light guiding plate is increasingly thin, assembly difficulty and working strength are increasing, thereby not only affecting assembly efficiency, but also failing to assure assembly yield.

SUMMARY OF THE INVENTION

The embodiments of the present disclosure provide an assembly fixture and assembly method for a backlight module, so as to improve assembly efficiency and assembly yield of the backlight module.

The embodiment of the present disclosure provides an assembly fixture for a backlight module comprising a set of optical elements and a back plate, wherein the set of optical elements comprise a protrusion structure located on a sidewall of the set of optical elements, and the back plate comprises a groove structure located in a sidewall of the back plate and matched with the protrusion structure; wherein the assembly fixture comprises:

a first assembling disk for carrying the set of optical elements;

a second assembling disk for carrying the back plate;

a vision alignment system for acquiring a first coordinate information of the set of optical elements and a second coordinate information of the back plate located on the second assembling disk when the set of optical elements is located right above the vision alignment system, and calculating a fitting location coordinate information regarding the set of optical elements and the back plate depending on the first coordinate information and the second coordinate information, and sending the fitting location coordinate information to a manipulator; and a manipulator for transferring the set of optical elements to right above of the vision alignment system, and aligning the set of optical elements with the back plate depending on the fitting location coordinate information, and embedding the protrusion structure of the set of optical elements into the groove structure of the back plate by a preset tilt angle, and then laying the set of optical elements on the back plate so that the set of optical elements and the back plate completely fit against each other.

In the assembly fixture for the backlight module according to the embodiment of the present disclosure, the set of optical elements are transferred to right above of the vision alignment system by the manipulator. When the set of optical elements are located right above the vision alignment system, the vision alignment system acquires the first coordinate information of the set of optical elements and the second coordinate information of the back plate located on the second assembling disk, calculates the fitting location coordinate information regarding the set of optical elements and the back plate depending on the first coordinate information and the second coordinate information, and sends the fitting location coordinate information to the manipulator. In this way, the manipulator aligns the set of optical elements with the back plate depending on the fitting location coordinate information, and embeds the protrusion structure of the set of optical elements into the groove structure of the back plate by the preset tilt angle, and then lays the set of optical elements on the back plate. As a result, the set of optical elements and the back plate completely fit against each other. By means of such assembly fixture, it may not only improve assembly efficiency, but also reduce error due to manual operation, and further improve assembly yield, since the assembly fixture implements the alignment strictly depending on the coordinate information of the back plate and the optical elements.

Optionally, the vision alignment system comprises a first vision alignment sub-system and a second vision alignment sub-system; the first vision alignment sub-system is configured to acquire the first coordinate information of the set of optical elements, and the second vision alignment sub-system is configured to acquire the second coordinate information of the back plate.

The first coordinate information of the set of optical elements is acquired by the first vision alignment sub-system; and the second coordinate information of the back plate is acquired by the second vision alignment sub-system. In this way, it enables to determine whether the alignment between the set of optical elements and the back plate in the present state meets setting requirement depending on the first coordinate information and the second coordinate information and determine how to move the set of optical elements correctly if the alignment does not meet the setting requirement, thus accurate alignment may be achieved quickly.

Optionally, the first vision alignment sub-system is a first set of cameras, and the second vision alignment sub-system is a second set of cameras.

When the first vision alignment sub-system is a first set of cameras, and the second vision alignment sub-system is a second set of cameras, the first coordinate information and the second coordinate information acquired are more accurate, thereby facilitating improving alignment accuracy and improving assembly yield.

Optionally, the preset tilt angle is in a range of 5 to 10°.

When the preset tilt angle is in a range of 5 to 10°, the set of optical elements may be optimally inserted into the groove structure of a plastic frame in an oblique manner, thereby improving assembly yield.

Optionally, the first assembling disk is provided with a plurality of first-type groove structures for carrying the set of optical elements, and the second assembly disk is provided with a plurality of second-type groove structures for carrying the back plate.

Optionally, the second-type groove structures are provided therein with vacuum suction structures for securing the back plate.

The back plate is secured by the vacuum suction structures for securing the back plate, which are provided in the second-type groove structures, therefore, the assembly may be easily implemented, thereby facilitating improving assembly yield and assembly efficiency.

Optionally, the manipulator is a six-axis manipulator.

The six-axis manipulator has advantages of fast speed, high precision, low and compact profile and heavy load, thus it facilitates improving production efficiency and assembly yield of the production.

Optionally, the assembly fixture further comprises an unloading structure for transferring the set of optical elements from the first assembly disk to an area where the manipulator is capable of grasping the set of optical elements.

Based on the same inventive concept, the embodiment of the present disclosure further provides a method for assembling a backlight module using the above-described assembly fixture, wherein the backlight module comprises a set of optical elements and a back plate, the set of optical elements comprise a protrusion structure located on a sidewall of the set of optical elements, and the back plate comprises a groove structure located in a sidewall of the back plate and matched with the protrusion structure; wherein the method comprises steps of:

transferring the set of optical elements from the first assembling disk to right above of the vision alignment system by the manipulator;

acquiring the first coordinate information of the set of optical elements located right above the vision alignment system and the second coordinate information of the back plate located on the second assembling disk, and calculating the fitting location coordinate information regarding the set of optical elements and the back plate depending on the first coordinate information and the second coordinate information, and sending the fitting location coordinate information to the manipulator, by the vision alignment system; and aligning the set of optical elements with the back plate depending on the fitting location coordinate information, and embedding the protrusion structure of the set of optical elements into the groove structure of the back plate by the preset tilt angle, and then laying the set of optical elements on the back plate, by the manipulator, so that the set of optical elements and the back plate fit against each other.

In the assembly method for the backlight module according to the embodiment of the present disclosure, the set of optical elements are transferred to right above of the vision alignment system by the manipulator. When the set of optical elements are located right above the vision alignment system, the vision alignment system acquires the first coordinate information of the set of optical elements and the second coordinate information of the back plate located on the second assembling disk, calculates the fitting location coordinate information regarding the set of optical elements and the back plate depending on the first coordinate information and the second coordinate information, and sends the fitting location coordinate information to the manipulator. In this way, the manipulator aligns the set of optical elements with the back plate depending on the fitting location coordinate information, and embeds the protrusion structure of the set of optical elements into the groove structure of the back plate by the preset tilt angle, and then lays the set of optical elements on the back plate. As a result, the set of optical elements and the back plate completely fit against each other. By means of such assembly method, it may not only improve assembly efficiency, but also reduce error due to manual operation, and further improve assembly yield, since the assembly process implement the alignment strictly depending on the coordinate information of the back plate and the optical elements.

Optionally, the vision alignment system comprises a first vision alignment sub-system and a second vision alignment sub-system, the step of acquiring the first coordinate information of the set of optical elements and the second coordinate information of the back plate located on the second assembling disk comprises:

acquiring the first coordinate information of the set of optical elements by the first vision alignment sub-system; and acquiring the second coordinate information of the back plate located on the second assembling disk by the second vision alignment sub-system.

The first coordinate information of the set of optical elements is acquired by the first vision alignment sub-system; and the second coordinate information of the back plate is acquired by the second vision alignment sub-system. In this way, it enables to determine whether the alignment between the set of optical elements and the back plate in the present state meets setting requirement depending on the first coordinate information and the second coordinate information, and determine how to move the set of optical elements correctly if the alignment does not meet the setting requirement, thus accurate alignment may be achieved quickly.

Optionally, the step of embedding the protrusion structure of the set of optical elements into the groove structure of the back plate by the preset tilt angle comprises:

embedding the protrusion structure of the set of optical elements into the groove structure of the back plate by a tilt angle in a range of 5 to 10°.

When the protrusion structure of the set of optical elements is embedded into the groove structure of the back plate by a tilt angle in a range of 5 to 10°, the set of optical elements may be optimally inserted into the groove structure of a plastic frame in an oblique manner, thereby improving assembly yield.

BRIEF DESCRIPTION OF THE DRAWINGS

FIG. 3 is a schematic view of an assembly method for a backlight module according to an embodiment of the present disclosure;

DETAILED DESCRIPTION OF PREFERRED EMBODIMENTS OF THE INVENTION

The embodiments of the present disclosure provide an assembly fixture and assembly method for a backlight module, so as to improve assembly efficiency and assembly yield of the backlight module.

In order to clearly present object, technical solution and advantage of the present disclosure, the technical solution of the embodiments of the present disclosure will be further described clearly and completely below, in combination with the accompanying figures in the embodiments of the present disclosure. Obviously, the described embodiments are merely a part of all embodiments, rather than all of embodiments.

Figure 1:
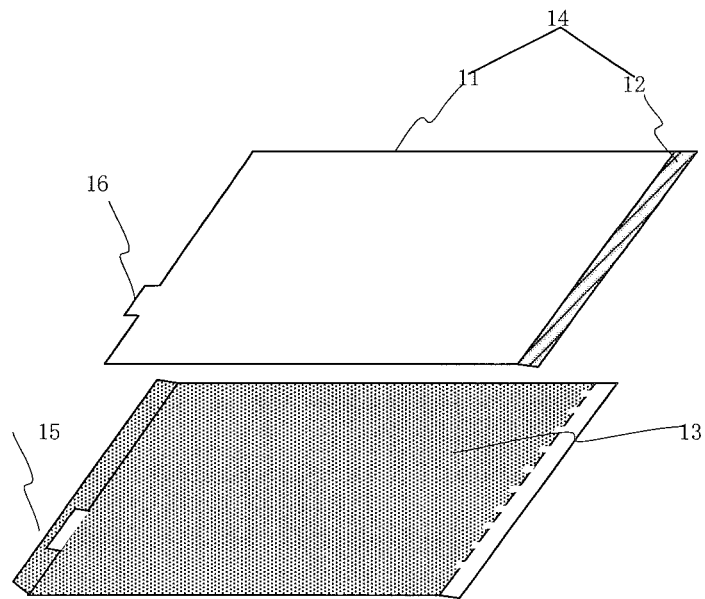
FIG. 1 is a schematic structural view of a backlight module in assembly process.
Figure 2:
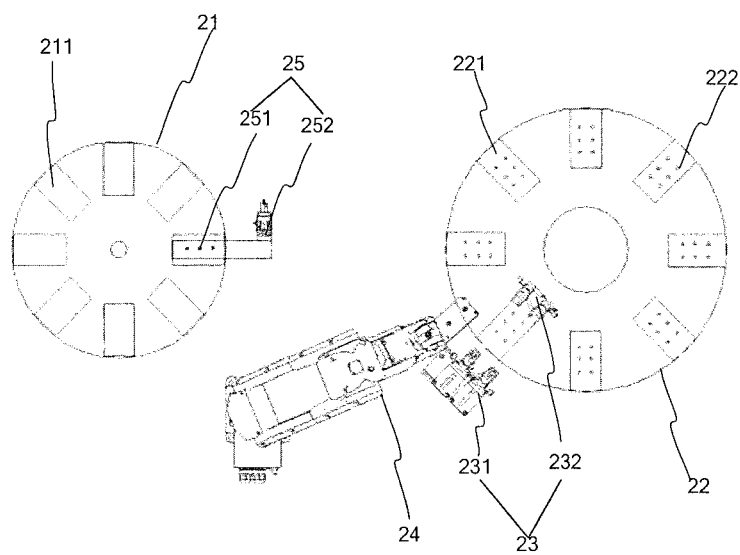
FIG. 2 is a schematic structural view of an assembly fixture for a backlight module according to an embodiment of the present disclosure.

As shown in FIG. 2, an embodiment of the present disclosure provides an assembly fixture for a backlight module comprising a set of optical elements 14 and a back plate 13, wherein the set of optical elements 14 comprise a protrusion structure 16 located on a sidewall of the set of optical elements, and the back plate 13 comprises a groove structure 15 located in a sidewall of the back plate and matched with the protrusion structure; as shown in FIG. 2, the assembly fixture comprises:

a first assembling disk 21 for carrying the set of optical elements 14;

a second assembling disk 22 for carrying the back plate 13;

a vision alignment system 23 for acquiring a first coordinate information of the set of optical elements 14 and a second coordinate information of the back plate 13 located on the second assembling disk when the set of optical elements 14 being located right above the vision alignment system 23, and calculating a fitting location coordinate information regarding the set of optical elements and the back plate depending on the first coordinate information and the second coordinate information, and sending the fitting location coordinate information to a manipulator 24; and a manipulator 24 for transferring the set of optical elements 14 to right above of the vision alignment system 23, and aligning the set of optical elements 14 with the back plate 13 depending on the fitting location coordinate information, and embedding the protrusion structure 16 of the set of optical elements 14 into the groove structure 15 of the back plate 13 by a preset tilt angle, and then laying the set of optical elements 14 on the back plate 13 so that the set of optical elements and the back plate 13 completely fit against each other.

In the assembly fixture for the backlight module according to the embodiment of the present disclosure, the set of optical elements are transferred to right above of the vision alignment system by the manipulator. When the set of optical elements are located right above the vision alignment system, the vision alignment system acquires the first coordinate information of the set of optical elements and the second coordinate information of the back plate located on the second assembling disk, calculates the fitting location coordinate information regarding the set of optical elements and the back plate depending on the first coordinate information and the second coordinate information and sends the fitting location coordinate information to the manipulator. In this way, the manipulator aligns the set of optical elements with the back plate depending on the fitting location coordinate information, and embeds the protrusion structure of the set of optical elements into the groove structure of the back plate by the preset tilt angle, and then lays the set of optical elements on the back plate. As a result, the set of optical elements and the back plate completely fit against each other. By means of such assembly fixture, it may not only improve assembly efficiency, but also reduce error due to manual operation, and further improve assembly yield, since the assembly fixture implements the alignment strictly depending on the coordinate information of the back plate and the optical elements.

Further, the vision alignment system 23 comprises a first vision alignment sub-system 231 and a second vision alignment sub-system 232; wherein the first vision alignment sub-system 231 is configured to acquire the first coordinate information of the set of optical elements 14, and the second vision alignment sub-system 232 is configured to acquire the second coordinate information of the back plate 13.

The first coordinate information of the set of optical elements is acquired by the first vision alignment sub-system; and the second coordinate information of the back plate is acquired by the second vision alignment sub-system. In this way, it enables to determine whether the alignment between the set of optical elements and the back plate in the present state meets setting requirement depending on the first coordinate information and the second coordinate information, and to determine how to move the set of optical elements correctly if the alignment does not meet the setting requirement, thus an accurate alignment may be achieved quickly.

Further, the first vision alignment sub-system 231 is a first set of cameras, and the second vision alignment sub-system 232 is a second set of cameras, such as a set of CCD cameras.

In a case that the first vision alignment sub-system is a first set of cameras and the second vision alignment sub-system is a second set of cameras, location information at a plurality of points of the set of optical elements is acquired by the first set of cameras, and location information at a plurality of points of the back plate is acquired by the second set of cameras, as a result, the first coordinate information and the second coordinate information acquired are more accurate, thereby facilitating improving alignment accuracy and improving assembly yield.

During the assembly process of the backlight module, the protrusion structure 16 of the set of optical elements is firstly generally embedded into the groove structure 15 of the back plate 13 in an oblique insertion manner, and then the set of optical elements are laid on the back plateto completely fit against the back plate. In the embodiment of the present disclosure, the preset tilt angle is generally in a range of 5 to 10° during oblique insertion. When the preset tilt angle is in a range of 5 to 10°, the set of optical elements may be optimally inserted into the groove structure of a plastic frame in an oblique manner, thereby improving assembly yield.

Further, the first assembling disk 21 is provided thereon with a plurality of first-type groove structures 211 for carrying the set of optical elements, so that the set of optical elements are placed in the first-type groove structures 211 to effectively prevent the set of optical elements from sliding out of the first assembling disk 21, thereby avoiding unnecessary damage. Similarly, the second assembly disk 22 is provided thereon with a plurality of second-type groove structures 221 for carrying the back plate, so that the back plate is placed in the second assembly disk 22 to effectively prevent the back plate from sliding out of the second assembly disk 22, thereby avoiding unnecessary damage and further facilitating improving production efficiency.

Since it is necessary to obliquely insert the set of optical elements into the back plate during the assembly process, the back plate is needed to be secured so as to avoid the back plate's sliding during the oblique insertion. In order to meet such requirement, the second-type groove structures 221 in the embodiment of the present disclosure are provided therein with vacuum suction structures 222 for securing the back plate. The back plate 13 is secured by the vacuum suction structures 222 so as to facilitate the assembly, thereby facilitating improving assembly yield and assembly efficiency.

Further, the manipulator 24 is a six-axis manipulator.

The six-axis manipulator has advantages of fast speed, high precision, low and compact profile and heavy load, thus it facilitates improving production efficiency and assembly yield of the production.

The assembly fixture further comprises an unloading structure 25 for transferring the set of optical elements from the first assembly disk to an area where the manipulator is capable of grasping the set of optical elements. In particular, the unloading structure 25 comprises a plurality of suction nozzles 251 for grasping the set of optical elements 14 and a flipping cylinder 252 for achieving flipping function.

The set of optical elements 14 are sucked by the plurality of suction nozzles 251 in the unloading structure 25 and are flipped by the flipping cylinder 252 by 180°, in this way, the set of optical elements 14 are placed in an area where they may be accessed by the manipulator 24.

In the assembly fixture for the backlight module according to the embodiment of the present disclosure, the set of optical elements are transferred to right above of the vision alignment system by the manipulator. When the set of optical elements are located right above the vision alignment system, the vision alignment system acquires the first coordinate information of the set of optical elements and the second coordinate information of the back plate located on the second assembling disk, calculates the fitting location coordinate information regarding the set of optical elements and the back plate depending on the first coordinate information and the second coordinate information, and sends the fitting location coordinate information to the manipulator. In this way, the manipulator aligns the set of optical elements with the back plate depending on the fitting location coordinate information, and embeds the protrusion structure of the set of optical elements into the groove structure of the back plate by the preset tilt angle, and then lays the set of optical elements on the back plate. As a result, the set of optical elements and the back plate completely fit against each other. By means of such assembly fixture, it may not only improve assembly efficiency, but also reduce error due to manual operation, and further improve assembly yield, since the assembly fixture implements the alignment strictly depending on the coordinate information of the back plate and the optical elements.

Based on the same inventive concept, the embodiment of the present disclosure further provides a method for assembling a backlight module using the above-described assembly fixture, wherein the backlight module comprises a set of optical elements 14 and a back plate 13, the set of optical elements 14 comprise a protrusion structure 16 located on a sidewall of the set of optical elements, and the back plate 13 comprises a groove structure 15 located in a sidewall of the back plate and matched with the protrusion structure 16. As shown in FIG. 3, by taking the assembly fixture according to the embodiment of the present disclosure as an example, the method comprises steps of:

Step 31: transferring the set of optical elements 14 from the first assembling disk 21 to right above of the vision alignment system 23 by the manipulator 24;

Step 32: acquiring the first coordinate information of the set of optical elements 14 located right above the vision alignment system and the second coordinate information of the back plate 13 located on the second assembling disk 22, and calculating the fitting location coordinate information regarding the set of optical elements 14 and the back plate 13 depending on the first coordinate information and the second coordinate information, and sending the fitting location coordinate information to the manipulator 24, by the vision alignment system 23; and Step 33: aligning the set of optical elements 14 with the back plate 13 depending on the fitting location coordinate information, and embedding the protrusion structure 16 of the set of optical elements into the groove structure 15 of the back plate by the preset tilt angle, and then laying the set of optical elements 14 on the back plate 13, by the manipulator 24, so that the set of optical elements and the back plate 13 fit against each other.

Further, the vision alignment system 23 comprises a first vision alignment sub-system 231 and a second vision alignment sub-system 232, the step of acquiring the first coordinate information of the set of optical elements 14 and the second coordinate information of the back plate 13 located on the second assembling disk comprises:

acquiring the first coordinate information of the set of optical elements 14 by the first vision alignment sub-system 231; and acquiring the second coordinate information of the back plate 13 located on the second assembling disk 22 by the second vision alignment sub-system 232.

The first coordinate information of the set of optical elements is acquired by the first vision alignment sub-system; and the second coordinate information of the back plate is acquired by the second vision alignment sub-system. In this way, it enables to determine whether the alignment between the set of optical elements and the back plate in the present state meets setting requirement depending on the first coordinate information and the second coordinate information, and determine how to move the set of optical elements correctly if the alignment does not meet the setting requirement, thus accurate alignment may be achieved quickly.

Further, the first vision alignment sub-system 231 is a first set of cameras, and the second vision alignment sub-system 232 is a second set of cameras.

In a case that the first vision alignment sub-system is a first set of cameras, and the second vision alignment sub-system is a second set of cameras, location information at a plurality of points of the set of optical elements is acquired by the first set of cameras, and location information at a plurality of points of the back plate is acquired by the second set of cameras, as a result, the first coordinate information and the second coordinate information acquired are more accurate, thereby facilitating improving alignment accuracy and improving assembly yield.

In the assembly process of the backlight module, the protrusion structure 16 of the set of optical elements is firstly generally embedded into the groove structure 15 of the back plate 13 in an oblique insertion manner, and then the set of optical elements is laid on the back plate, so as to completely fit against the back plate.

Further, the step of embedding the protrusion structure of the set of optical elements into the groove structure of the back plate by the preset tilt angle comprises:

embedding the protrusion structure of the set of optical elements into the groove structure of the back plate by a tilt angle in a range of 5 to 10°.

When the protrusion structure of the set of optical elements is embedded into the groove structure of the back plate by a tilt angle in a range of 5 to 10°, the set of optical elements may be optimally inserted into the groove structure of a plastic frame in an oblique manner, thereby improving assembly yield.

Further, the manipulator 24 is a six-axis manipulator.

The six-axis manipulator has advantages of fast speed, high precision, low and compact profile and heavy load, thus it facilitates improving production efficiency and assembly yield of the production.

The assembly fixture further comprises an unloading structure 25 for transferring the set of optical elements from the first assembly disk to an area where the manipulator is capable of grasping the set of optical elements. In particular, the unloading structure 25 comprises a plurality of suction nozzles 251 for grasping the set of optical elements 14 and a flipping cylinder 252 for achieving flipping function. The step of transferring the set of optical elements 14 from the first assembling disk 21 to right above of the vision alignment system 23 by the manipulator 24 comprises:

sucking the set of optical elements 14 by the plurality of suction nozzles 251 in the unloading structure 25 and flipping the set of optical elements 14 by 180° by the flipping cylinder 252, so as to place the set of optical elements 14 in an area where they may be accessed by the manipulator 24;

acquiring the set of optical elements 14 and transferring the set of optical elements 14 to right above of the vision alignment system 23 by the manipulator 24.

Figure 4:
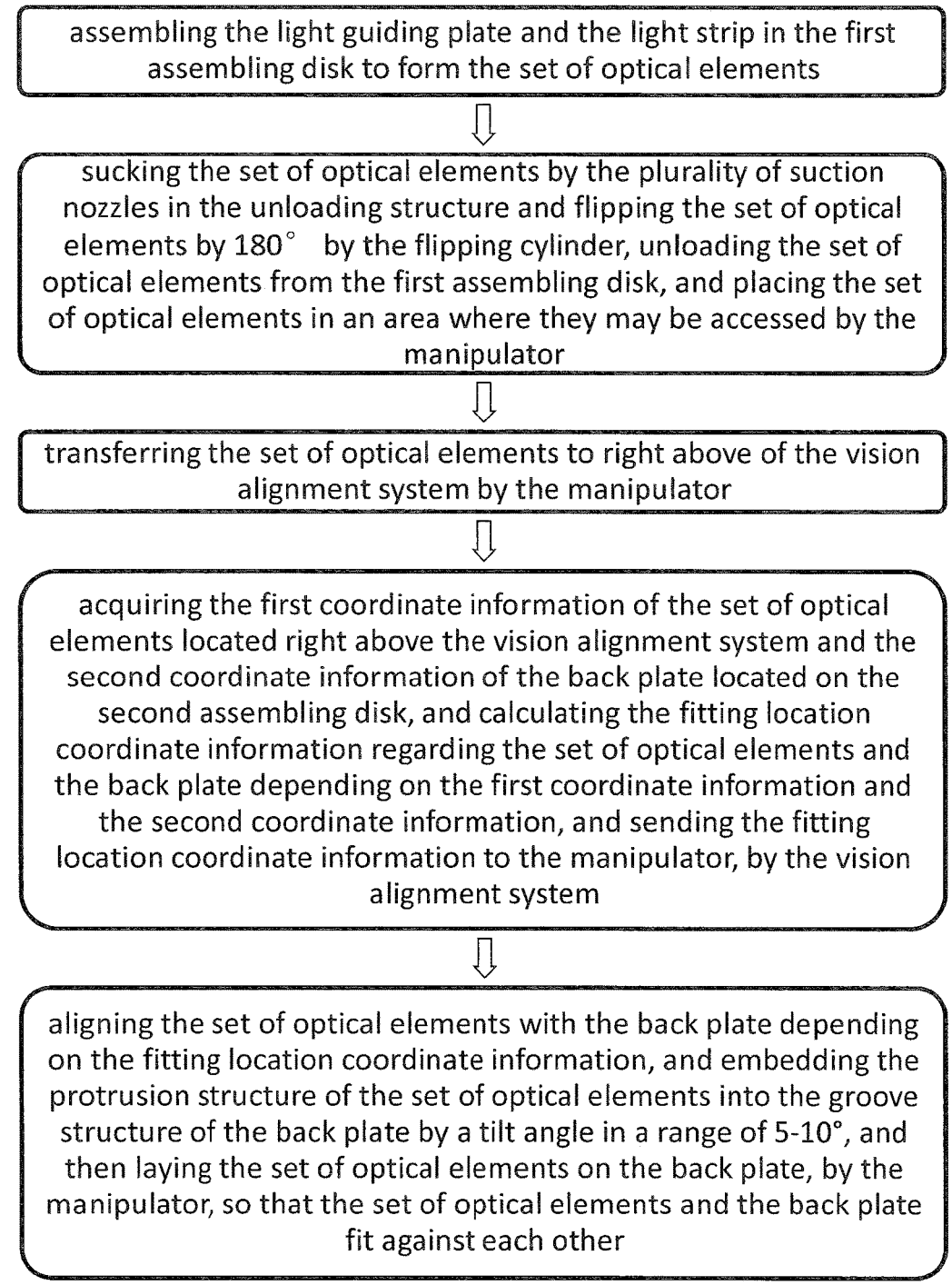
FIG. 4 is a schematic view of an assembly method for a backlight module according to an embodiment of the present disclosure.
Figure 5:
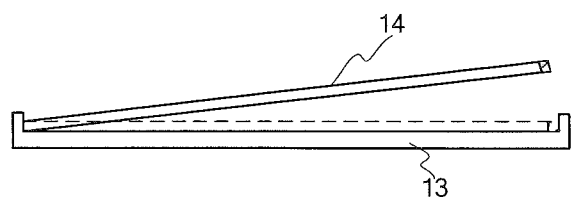
FIG. 5 is a schematic view showing that a set of optical elements is secured on a back plate in an oblique insertion manner according to an embodiment of the present disclosure.

Based on the assembly fixture and the assembly method of the embodiments of the present disclosure, the present disclosure further provides an assembly method for a backlight module, as shown in FIG. 4, the method comprises:

Step 41: assembling the light guiding plate 11 and the light strip 12 in the first assembling disk to form the set of optical elements 14;

Step 42: sucking the set of optical elements 14 by the plurality of suction nozzles 251 in the unloading structure 25 and flipping the set of optical elements 14 by 180° by the flipping cylinder 252, unloading the set of optical elements 14 from the first assembling disk 21, and placing the set of optical elements 14 in an area where they may be accessed by the manipulator 24;

Step 43: transferring the set of optical elements 14 to right above of the vision alignment system 23 by the manipulator 24;

Step 44: acquiring the first coordinate information of the set of optical elements 14 located right above the vision alignment system and the second coordinate information of the back plate 13 located on the second assembling disk 22, and calculating the fitting location coordinate information regarding the set of optical elements 14 and the back plate 13 depending on the first coordinate information and the second coordinate information, and sending the fitting location coordinate information to the manipulator 24, by the vision alignment system 23;

wherein the step of acquiring the first coordinate information of the set of optical elements 14 located right above the vision alignment system and the second coordinate information of the back plate 13 located on the second assembling disk 22 by the vision alignment system 23 comprises:

acquiring the first coordinate information of the set of optical elements 14 by the first set of cameras; and acquiring the second coordinate information of the back plate 13 by the second set of cameras;

Step 45: aligning the set of optical elements 14 with the back plate 13 depending on the fitting location coordinate information, and embedding the protrusion structure of the set of optical elements into the groove structure of the back plate by a tilt angle in a range of 5-10° (referring to FIG. 5), and then laying the set of optical elements 14 on the back plate 13, by the manipulator 24, so that the set of optical elements and the back plate 13 fit against each other.

In the assembly method for the backlight module according to the embodiment of the present disclosure, the set of optical elements are transferred to right above of the vision alignment system by the manipulator. When the set of optical elements are located right above the vision alignment system, the vision alignment system acquires the first coordinate information of the set of optical elements and the second coordinate information of the back plate located on the second assembling disk, calculates the fitting location coordinate information regarding the set of optical elements and the back plate depending on the first coordinate information and the second coordinate information, and sends the fitting location coordinate information to the manipulator. In this way, the manipulator aligns the set of optical elements with the back plate depending on the fitting location coordinate information, and embeds the protrusion structure of the set of optical elements into the groove structure of the back plate by the preset tilt angle, and then lays the set of optical elements on the back plate. As a result, the set of optical elements and the back plate completely fit against each other. By means of such assembly method, it may not only improve assembly efficiency, but also reduce error due to manual operation, and further improve assembly yield, since the assembly process implements the alignment strictly depending on the coordinate information of the back plate and the optical elements.

In summary, the present disclosure provides an assembly fixture and assembly method for a backlight module, so as to improve assembly efficiency and assembly yield of the backlight module. In the assembly fixture, the set of optical elements are transferred to right above of the vision alignment system by the manipulator. When the set of optical elements are located right above the vision alignment system, the vision alignment system acquires the first coordinate information of the set of optical elements and the second coordinate information of the back plate located on the second assembling disk, calculates the fitting location coordinate information regarding the set of optical elements and the back plate depending on the first coordinate information and the second coordinate information, and sends the fitting location coordinate information to the manipulator. In this way, the manipulator aligns the set of optical elements with the back plate depending on the fitting location coordinate information, and embeds the protrusion structure of the set of optical elements into the groove structure of the back plate by the preset tilt angle, and then lays the set of optical elements on the back plate. As a result, the set of optical elements and the back plate completely fit against each other. By means of such assembly fixture, it may not only improve assembly efficiency, but also reduce error due to manual operation, and further improve assembly yield, since the assembly fixture implements the alignment strictly depending on the coordinate information of the back plate and the optical elements.

Obviously, various modifications and alterations may be made to the present disclosure by the person skilled in the art without departing from the spirit and scope of the present disclosure. Thus, if such modifications and alterations to the present disclosure belong to the scope of claims of the present disclosure and equivalent substitutions thereof, then the present disclosure is intended to incorporate such modifications and alterations therein.

What is claimed is:

1. An assembly fixture for a backlight module comprising a set of optical elements and a back plate, wherein the set of optical elements comprise a protrusion structure located on a sidewall of the set of optical elements, and the back plate comprises a groove structure located in a sidewall of the back plate and matched with the protrusion structure; wherein the assembly fixture comprises:
    a first assembling disk for carrying the set of optical elements;
    a second assembling disk for carrying the back plate;
    a vision alignment system for acquiring a first coordinate information of the set of optical elements and a second coordinate information of the back plate located on the second assembling disk when the set of optical elements is located right above the vision alignment system, and calculating a fitting location coordinate information regarding the set of optical elements and the back plate depending on the first coordinate information and the second coordinate information, and sending the fitting location coordinate information to a manipulator; and
    said manipulator for transferring the set of optical elements to right above of the vision alignment system, and aligning the set of optical elements with the back plate depending on the fitting location coordinate information, and embedding the protrusion structure of the set of optical elements into the groove structure of the back plate by a preset tilt angle, and then laying the set of optical elements on the back plate so that the set of optical elements and the back plate completely fit against each other,
    wherein the vision alignment systems comprises a first vision alignment sub-system and a second vision alignment sub-system; the first vision alignment sub-system is congfigured to acquire the first coordinate information of the set of optical elements, and the second vision alignment sub-system is configured to acquire the second coordinate information of the back plate.

2. The assembly fixture according to claim 1, wherein the first vision alignment sub-system is a first set of cameras, and the second vision alignment sub-system is a second set of cameras.

3. The assembly fixture according to claim 1, wherein the preset tilt angle is in a range of 5 to 10°.

4. The assembly fixture according to claim 1, wherein the first assembling disk is provided with a plurality of first-type groove structures for carrying the set of optical elements, and the second assembly disk is provided with a plurality of second-type groove structures for carrying the back plate.

5. The assembly fixture according to claim 4, wherein the second-type groove structures are provided therein with vacuum suction structures for securing the back plate.

6. The assembly fixture according to claim 1, wherein the manipulator is a six-axis manipulator.

7. The assembly fixture according to claim 1, wherein the assembly fixture further comprises an unloading structure for transferring the set of optical elements from the first assembly disk to an area where the manipulator is capable of grasping the set of optical elements.

* * * * *